United States Patent [19]

Fisher

[11] 4,133,013
[45] Jan. 2, 1979

[54] VIDEO CASSETTE CHANGER-PROGRAMMER

[75] Inventor: Robert M. Fisher, Santa Monica, Calif.

[73] Assignee: Programmable Systems, Inc., Hawthorne, Calif.

[21] Appl. No.: 765,441

[22] Filed: Feb. 4, 1977

[51] Int. Cl.$^2$ .................. G11B 15/68; G11B 23/04
[52] U.S. Cl. ............................. 360/92; 360/70; 242/197
[58] Field of Search ............. 360/92, 96, 95, 93, 360/71, 74, 85, 70, 69; 358/185, 254; 242/197–200

[56] References Cited

U.S. PATENT DOCUMENTS

| | | | |
|---|---|---|---|
| 3,083,269 | 3/1963 | Gaubert | 360/92 |
| 3,247,328 | 4/1966 | Mitchell et al. | 360/92 |
| 3,879,758 | 4/1975 | Pyles | 360/92 |
| 3,881,053 | 4/1975 | Lemelson | 360/74 |
| 3,956,768 | 5/1976 | Covington | 360/92 |
| 3,987,484 | 10/1976 | Bosche et al. | 360/72 |

*Primary Examiner*—Alfred H. Eddleman
*Attorney, Agent, or Firm*—W. Edward Johansen

[57] ABSTRACT

The invention is an automatic, programmable video cassette player-changer in combination with a plurality of video cassette players which use video cassettes containing visual material for a television audience and a television monitor electrically coupled to each of the video cassette players. The video cassette player-changer includes a plurality of vertically stacked cassette trays which are adapted to contain the video cassettes and a support member adapted to maintain the vertically stacked cassette trays in a fixed position. The video cassette player-changer also includes a motor adapted so that it may be driven in two directions, a screw mechanically coupled to the motor so that it rotates in response to the motor, a coupling device which couples the rotating screw to the support member so the rotating screw raises and lowers the support member. The video cassette player-changer further includes a housing adapted to contain the plurality of video cassette players, the plurality of vertically stacked cassette trays and their support member, the motor, screw and coupling device, and the television monitor. There is also a cassette changing device for unloading or loading the video cassette players which is mechanically coupled to the cassette trays. A programming apparatus programs what video cassette will be played in a particular video cassette player at a particular time by electrically controlling both the motor and the cassette changing device so that the particular video cassette may be placed in the particular video cassette player.

3 Claims, 9 Drawing Figures

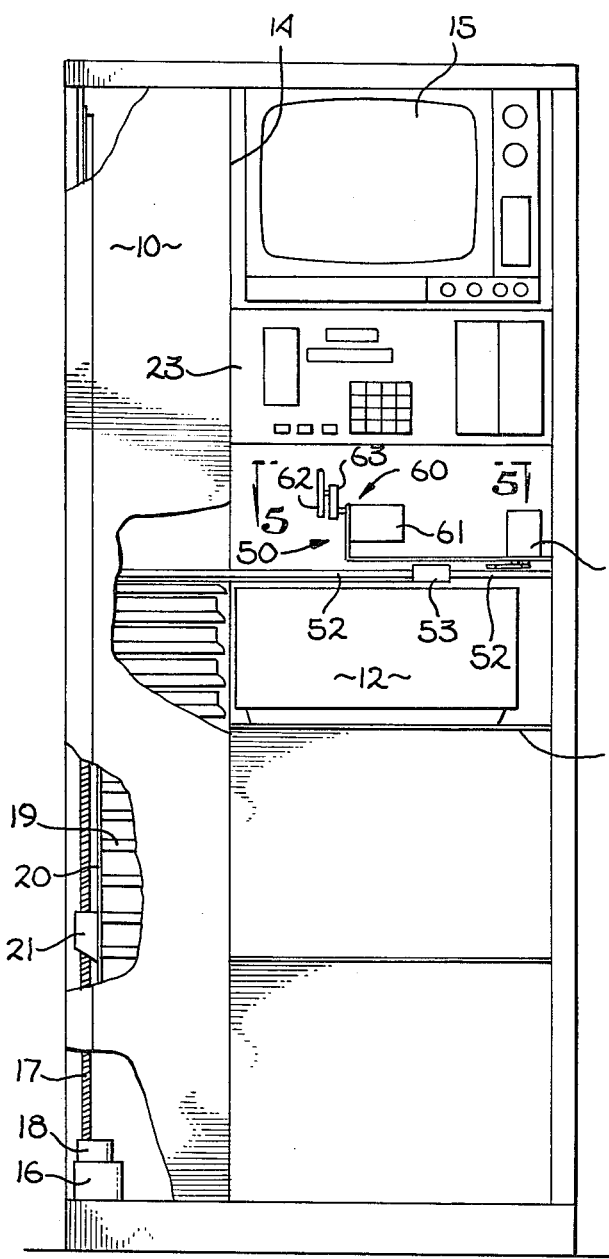
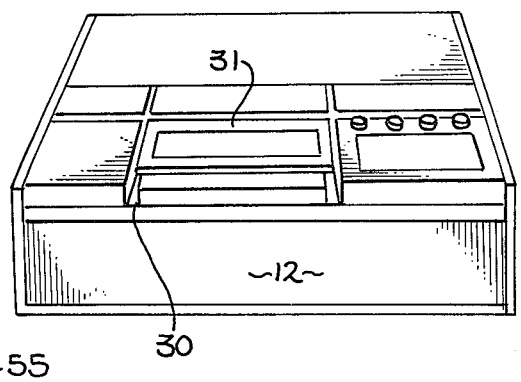
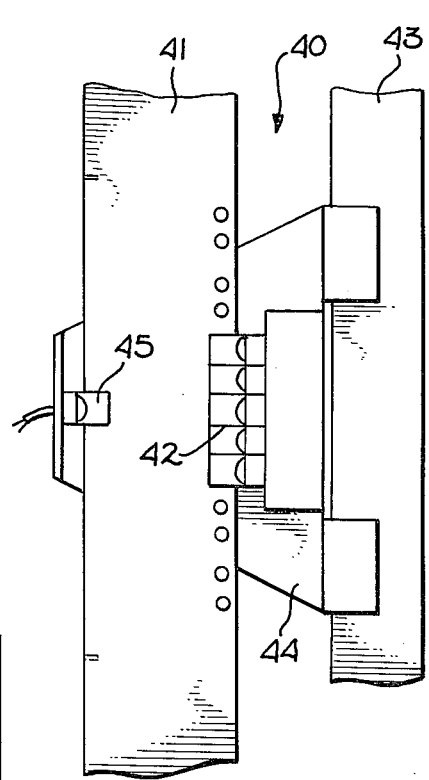
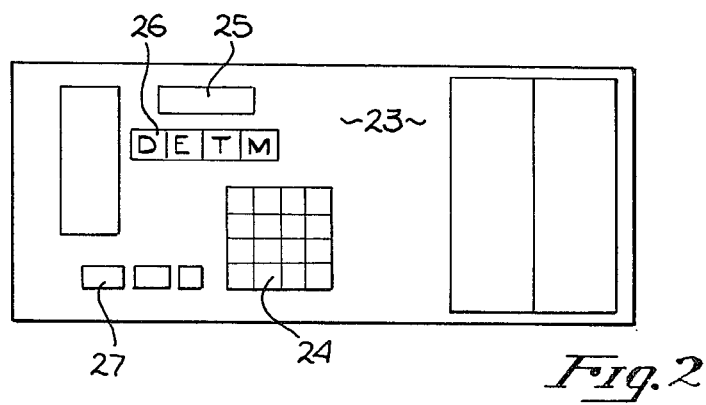
Fig. 1
Fig. 3
Fig. 4
Fig. 2

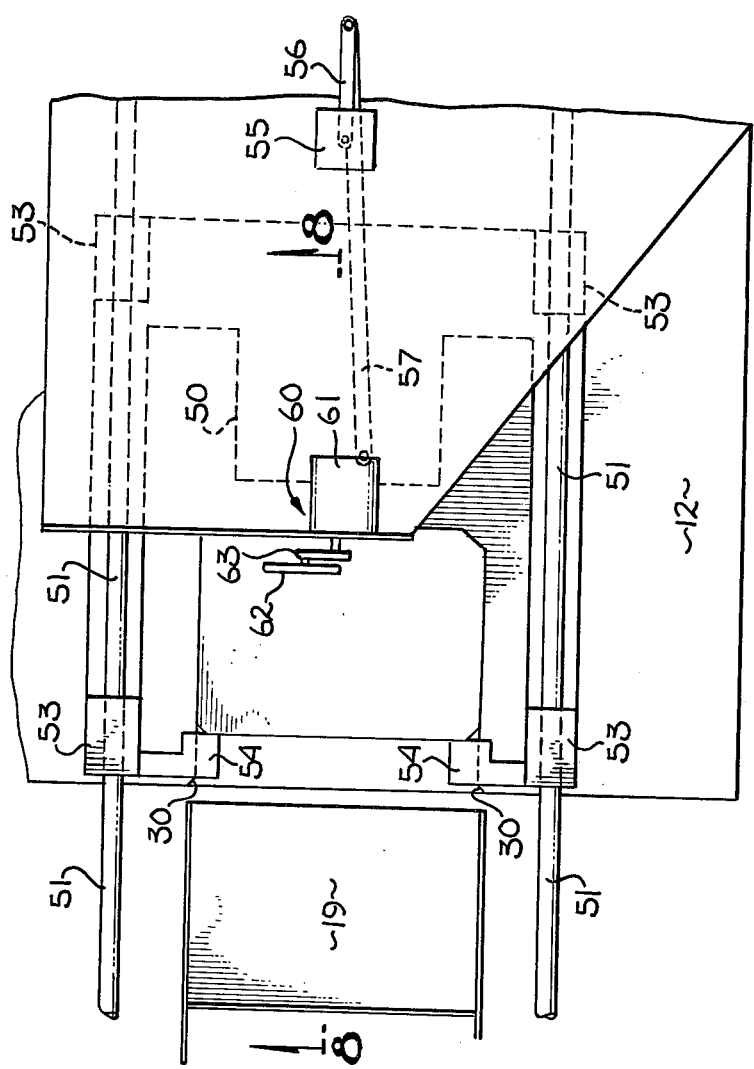
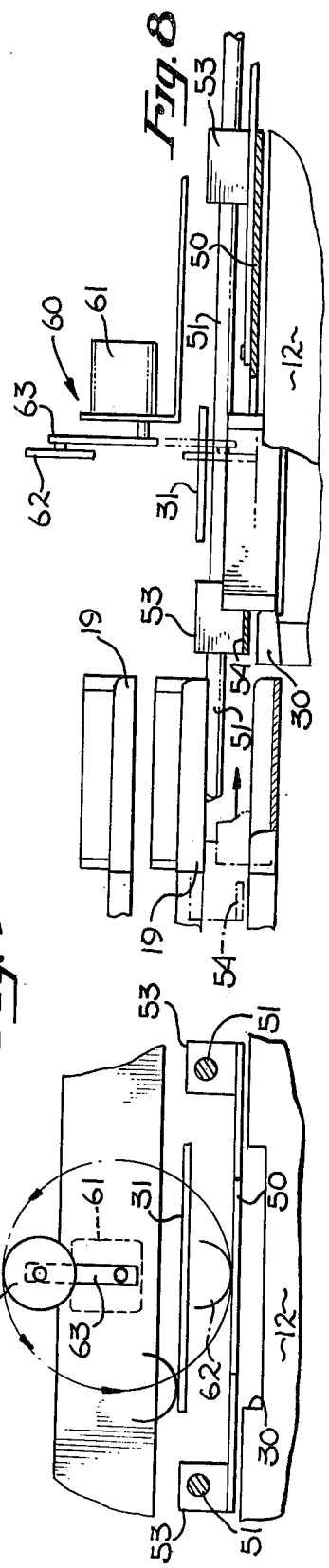
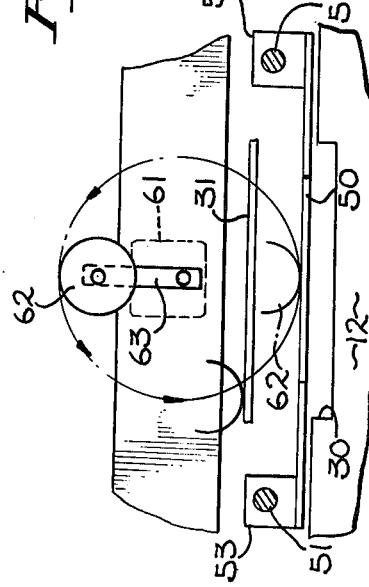

VIDEO CASSETTE CHANGER-PROGRAMMER

BACKGROUND OF THE INVENTION

1. Field of the Invention

The present invention relates to a video cassette changer-programmer system, and more particularly to a video cassette changer-programmer that provides a weekly program that may be varied on a daily basis.

2. Description of the Prior Art

With the advent of the Sony U-matic Type II Player/Recorder, generally referred to as video cassette players, has come a group of video cassette changer-programmer systems that provide entertainment to concentrated living groups, including residents of condominiums and apartments and guests at motels and hotels. The use of these systems also extends to the cable television industry to enable this industry to provide its customers full length movies. One company has a video cassette changer-programmer, the VJB-12, that plays through a set of 12 U-matic cassettes in sequence. After the system has played all twelve cassettes, it rewinds the cassettes. In the alternative, each cassette may be rewound after it has been played. There are provisions for varying the sequence of the cassette being played.

U.S. Pat. No. 3,956,768, entitled Videotape Cassette Automatic Loader-Unloader, issued to Edward L. Covington on May 11, 1976, teaches an automatic loader-unloader of cassettes to and from a videotape deck which operates in conjunction with the Sony U-matic videotape player. The automatic loader-unloader includes a device which tilts and supports the videotape with its top surface at a selected angle to the horizontal, and provides a shelf in front of the deck with the shelf co-planar with the top surface of the deck loading device means is provided by means of an arm mounted above and parallel to the deck surface with a device adapted to press against the back edge and top surface of the cassette when mounted on the shelf, so as to provide two components of force, one parallel to the plane of the cassette, causing it to move off the shelf and on to the elevator plate of the tape deck, and a second force perpendicular to the surface of of the cassette so that when the deck is positioned on the elevator, and extends the eject spring, the downward force will cause the elevator to move downwardly and into the recording position. To unload the deck there are devices which operate the eject lever on the tape deck, which lifts the elevator to move to its upper position, and the eject plate exerts a force on the cassette to move it forwardly, off the elevator plate from which it falls, by gravity, along the surface of the elevator and of the shelf, to be positioned on the shelf.

U.S. Pat. No. 3,879,758, entitled Tape Cartridge Changer with Selective Cartridge and Track Programming Controls, issued to Gerald Dee Pyles on Apr. 22, 1975, teaches a tape cartridge changer which includes an array of cartridge receptacles adapted to receive a plurality of tape cartridges to be automatically played, either selectively or sequentially. A portion of the changer playing mechanism is mounted on a movable platform which traverses a path of travel adjacent to the array of cartridge receptacles.

Mechanical switches are connected in a control circuit to control the operation of the changer. The mechanical switches are operable to provide two modes of operation for the cartridge changer. In the first mode of operation, the cartridge changer automatically plays the plurality of tape cartridges in the array of cartridge receptacles and thereafter totally de-energizes the changer. In the second mode of operation, the cartridge changer automatically repetitively replays the plurality of tape cartridges.

A series of controls are located adjacent to each of the cartridge receptacles of the array to permit control of the changer operation at each receptacle position. The contacts associated with the controls cooperate with contacts mounted to an assembly on the movable platform. The contacts on the movable platform sequentially engage the contacts associated with the controls at each of the cartridge receptacle positions to connect each of the controls in the changer control circuit.

U.S. Pat. No. 3,247,328, entitled Automatic Tape Programming, issued to Ulyss S. Mitchell and Alva Robert Myers on Apr. 19, 1966, teaches a device which will play a tape from any selected cartridge in response to a signal received from a selector unit which includes a device for predetermining the sequence of the selections to be played during a particular program which in itself may be set up upon the selector unit.

The cable television industry makes use of the video cassette players in its automatic program origination systems. One such system has a set of six video cassette players for its standard four channel unit. The video cassette players are controlled by audio/video cassette switches with issue commands to the video cassette players. The audio/video cassette switches are controlled by a tape, on which there are recorded digital command words, by each other, by automatic timers, by special purpose command word generators, by remote data terminals and by computers. In operation the system has an automatic timer start the preview and the first reel of each movie at a pre-selected time each day. At the end of the programming the reels of the movie are rewound.

Both of the above-described programming systems are limited in their programming flexibility. The need is for a system that can not only play two or more movies simultaneously, but that can also play these movies in any sequence desired. The computer industry is presently far ahead of the video cassette player industry but reference to U.S. Pat. No. 3,920,195, entitled Automatic Tape Reel Mount, issued to Richard E. Sills and Gary L. Allison on Nov. 18, 1975, is useful in that this patent teaches an on-line automated tape library system.

Several patents which are more relevant in that they teach similar devices for magnetic tape cassettes and video cassettes include U.S. Pat. No. 3,620,385, U.S. Pat. No. 3,724,775, U.S. Pat. No. 3,722,828, U.S. Pat. No. 3,614,022, U.S. Pat. No. 3,550,879, U.S. Pat. No. 3,863,863, and U.S. Pat. No. 3,758,047.

U.S. Pat. No. 3,620,385, entitled Conveying Apparatus for a Magnetic Tape Cartridge Changer, issued to Leopold Petrus Johannes Vermeijlen Emmasingel and Friedrich Laa on Nov. 16, 1971, teaches a magnetic tape cartridge changer for playing a plurality of stacked tape cartridges in sequence. U.S. Pat. No. 3,722,828, entitled Cinematographic Apparatus for use with Cassetted for Motion Picture Film, issued to Rudolf Kremp and Fridolin Henning on Mar. 27, 1973, teaches a motion picture projector wherein the top wall of the housing supports a detachable upright duct for a stack of horizontal film-containing cassettes. The lowermost cassette of the stack dwells in a projection position in which the film can be automatically withdrawn from such cassette in order to be threaded through the projector and attached to the core of the take-up reel. An automatic rewinding unit rewinds the film and expels the cassete into a detachable collecting receptacle.

U.S. Pat. No. 3,614,022, entitled Projector for Automatically Threading, Rewinding, and Indexing a Plurality of Film Spools and a Magazine, issued to Elmer C. Henriksen on Oct. 19, 1971, teaches a magazine having a plurality of adjoining reel compartments that supplies film from successive reels in a film path for forward projection and receives film returned from the path during reverse projection and rewind. Once the film is projected, it is rewound upon the supply reel and the magazine is indexed to present a new film supply reel for projection. The films are shown sequentially. U.S. Pat. No. 3,724,775, entitled Film Reel Support Assembly for Projectors, issued to Arthur E. Nupnau on Apr. 3, 1973, teaches a support assembly adaptable for supporting varying sized reels of film at a projection station on a motion picture projector. The support assembly includes a gate member having a first position to permit projecting any one of a plurality of like-sized reels of film supported on the projector and having a second position to permit projecting a selected one of the varying sized reels of film. U.S. Pat. No. 3,550,879, entitled Cinematographic Cartridge Projector Apparatus, issued to John J. Bundschuh, Robert J. Roman and Kenneth W. Thompson on December 29, 1970, teaches a projection apparatus for use with cartridges containing rolls of film in which the cartridge may either be selectively or automatically moved in sequence into an operational position. U.S. Pat. No. 3,758,047, entitled Motion Picture Projector, issued to Jack W. Thomsen, Arthur E. Nupnau, Raymond W. H. Kim and Jaroslav Cherniavskyj on Sept. 11, 1973, teaches a shuttle that is manually adjustable transversely of a film path to enable engagement of its claw in sprocket performations of standard 8 mm films for intermittent movement thereof in opposite projection direction. Finally, U.S. Pat. No. 3,863,862, entitled Cinematograph Projection Apparatus, issued to Peter Robbins and Leroy G. Osborn on Feb. 4, 1975, teaches a film pay-off and take-up accessory for a film projector. The accessory includes a first and a second pair of pay-off and take-up reels. This apparatus is similar to the automatic program origination system described above.

SUMMARY OF THE INVENTION

In view of the foregoing problems and conditions characteristic of the prior art, it is a primary object of the present invention to provide an improved video cassette player-changer that can be programmed for week's viewing with a daily change in the viewing program.

It is another object of the present invention to provide a video cassette player-changer that may play a plurality of video cassettes in any order and not just in sequence.

It is still another object of the present invention to provide a video cassette player-changer that is adaptable so that it program in the rewinding of any cassette during any time of a daily program.

It is yet still another object of the present invention to provide a video cassette player-changer that is adapable so it can program a plurality of video cassette players to play a plurality of viceo cassettes simultaneously and in any desired order which may be programmed for a week to change on a daily basis.

In with an embodiment of the present invention an improved video cassette player-changer which is both automatic and programmable and which is used in combination with a plurality of video cassette players which use video cassettes containing visual material for a television audience and a television monitor electrically coupled to each of the video cassette players has been described. The improved video cassette player-changer includes a plurality of vertically stacked cassette trays which are adapted to contain the video cassettes and a support member adapted to maintain the vertically stacked cassette trays in a fixed position. The video cassette player-changer also includes a motor adapted so that it may be driven in two directions, a screw mechanically coupled to the motor so that it rotates in response to the motor, a coupling device which couples the rotating screw to the support member so that the rotating screw raises and lowers the support member. The video cassette player-changer further includes a housing adapted to contain the plurality of video cassette players, the plurality of vertically stacked cassette trays and their support member, the motor, screw and coupling device, and the television monitor. There is also a cassette changing device for unloading or loading the video cassette players which is mechanically coupled to the cassette trays. A programming apparatus programs what video cassette will be played in a particular video cassette player at a particular time by electrically controlling both the motor and the cassette changing device so that the particular video cassette may be placed in the particular video cassette player.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a front elevational view of a cabinet housing an automatic, programmable video cassette player-changer which is constructed in accordance with the present invention.

FIG. 2 is a front elevational view of the control panel of the automatic, programmable video cassette player-changer of FIG. 1.

FIG. 3 is a perspective view of a Sony VP-2600 video cassette player which is used in combination with the present invention.

FIG. 4 is a side view of the sensor system of the automatic, programmable video cassette player-changer of FIG. 1.

FIG. 7 is a cross-sectional view of the cabinet of FIG. 1 along the line 5—5 showing the cassette retrieve and return system of the video cassette player-changer when the video cassette has been positioned within the cassette chamber of the video cassette player.

FIG. 8 is a side view of the plurality of vertically stacked cassette trays and the cassette retrieve and return system of the video cassette player-changer of FIG. 1.

FIG. 9 is a front elevational view of the device for pushing the video cassette into the video cassette player of FIG. 6.

DESCRIPTION OF THE PREFERRED EMBODIMENT

Figure 5:
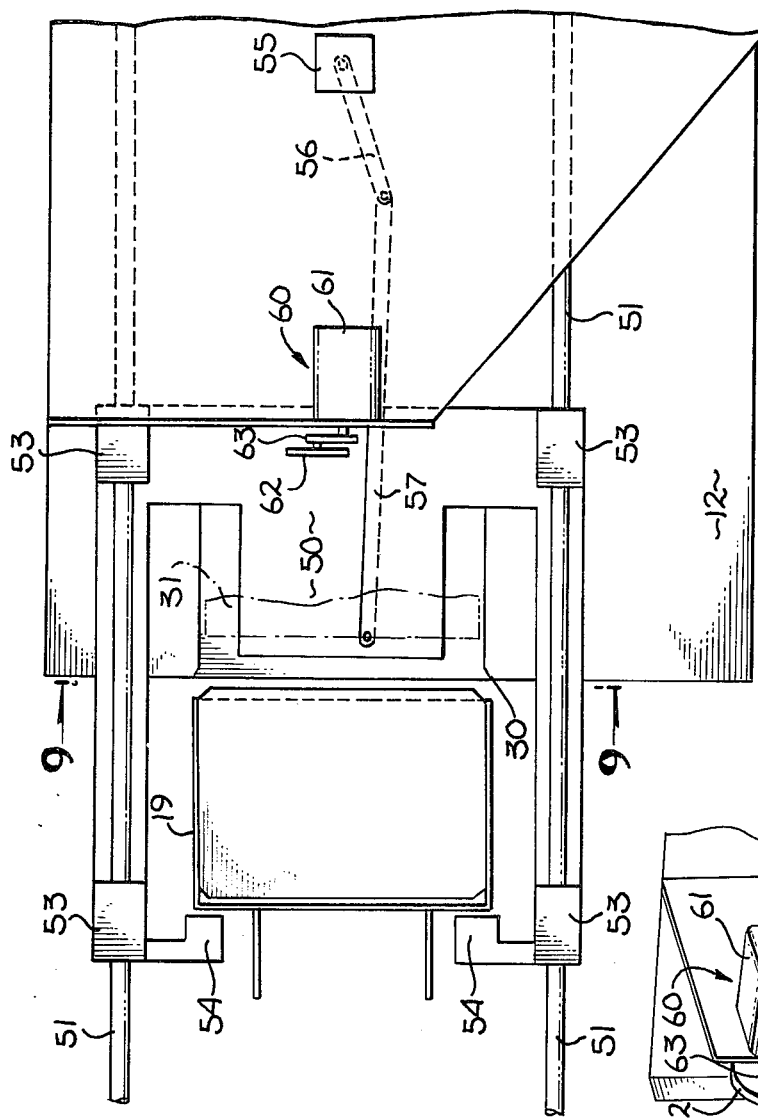
FIG. 5 is a cross-sectional view of the cabinet of FIG. 1 along the line 5—5 showing the cassette retrieve and return system of the video cassette player-changer when a video cassette is still positioned on a cassette tray.

The present invention is an automatic, programmable video cassette player-changer which may be used in combination with a plurality of video cassette players. The present invention can best be understood by reference to a description of its preferred embodiment in conjunction with the figures of the drawing. FIG. 1 is a front elevational view of a cabinet 10 which houses an automatic, programmable video cassette player-changer 11 and a plurality of video cassette players 12 which are mechanically and electrically coupled to the automatic, programmable video cassette player-changer 11. The cabinet 10 also has mounting racks 13, on each of which one of the plurality of video cassette players 12 rests and a mounting member 14 for a television monitor 15. The video cassette players 12 are electrically coupled to the television monitor 15.

Still referring to FIG. 1 the video cassette player-changer 11 includes a first motor 16 and a screw 17 adapted to extend approximately the height of the cabinet 10 and mechanically coupled to the first motor 16 by a first coupling device 18 so that the first motor may rotate the screw 17 bidirectionally. The first motor 16 is disposed at the base of the cabinet 10. The video cassette player-changer 11 also includes a plurality of vertically stacked cassette trays 19, each cassette tray 19 adapted to contain one of the video cassettes, a support member 20 which is adapted to maintain the plurality of vertically stacked cassettes trays 19 in a fixed position, and a second coupling device 21 for coupling the support member 20 to the screw 17 so that the support member 20 is raised or lowered by the rotation of the screw 17. The video cassette player-changer 11 further includes a control panel 23.

In FIG. 2 the control panel 23 of the automatic, programmable video cassette player-changer is shown to include a keyboard 24 on which there are ten digits, an enter tray function, an enter mode function, a set day function, an event up display function, an event down display function and a set auxiliary function. The control panel 23 also includes a time of day display 25, that serves as a clock for the system, and program display 26 which shows the day of the week, the event, tray number and mode.

All of the programming is transmitted into a computer which is not shown because the present invention is a mechanical device relating to the video cassette player-changer 11. The computer may be any prior art computer that is programmable to send a series of commands to mechanical devices such as motors and video cassette players.

There is also an automatic/manual button 27 on the control panel 23 for transferring control of the video cassette player-changer 11 from the computer to the programmer.

Referring now to FIG. 3, which is a perspective drawing of the vidoe cassette player 12 that is used in combination with the video cassette player-changer 11. The video cassette player 12 is a Sony VP-2600 model and has several important features that enable it to be used with the present invention. First, the video cassette player 12 is adapted so that its rewind function, its eject function and its start function are controlled by the computer of the video cassette player-changer 11. Second, the video cassette player 12 has a chassette chamber 30 which is covered by planar top 31 which, when the cassette is to be ejected, is lifted up to another parallel plane above the video cassette player 12; the video cassette is similarly lifted up so that it may be ejected by a retrieve and return system of the video cassette player-changer 11. The computer also controls other electrical functions of the video cassette player 12.

Referring now to FIG. 4 the video cassette player-changer 11 has a sensor system 40 for sensing the position of the support member 20 so that the vertical location of a particular cassette tray 19 may be determined. The sensor system 40 is electrically coupled to the computer of the video cassette player-changer 11 so that the vertical location of a particular cassette tray 19 may be transmitted thereto. The sensor system 40 includes a binary coded strip 41 mechanically mounted to the cabinet 10 and a plurality of sensors 42 which are mounted to a guide rail 43 for the vertically stacked cassette trays 19 by a sensor bracket 44. The sensor system 40 has an oppositely disposed sensor 45 that is electrically coupled to the plurality of sensors in order to determine the pattern of the binary coded strip 41. When the sensors 42 and 45 identify the desired pattern they send a signal to the computer which stops the rotation of the first motor 16.

Referring now to FIG. 5 the video cassette player-changer 11 has a cassette changing device 50 for unloading or loading the video cassette. The cassette changing device 50 is mechanically coupled to the cassette trays 19, electrically coupled to the computer and disposed in the cabinet 10. The cassette changing device 50 includes a pair of support and guide rods 51, a return and retrieve plate 52 and a set of four nylon bearings 53 which are mounted in the corners of the return and retrieve plate 52 and mechanically coupled to the pair of support and guide rods 51 so that the return and retrieve plate 52 may move laterally in the horizontal plane and perpendicular to the vertically stacked cassette trays 19. The cassette changing device 50 also includes a pair of L-shaped members 54 which are attached to the nylon bearings 53 in the rear corners of the return and retrieve plate 52 and which are adapted and disposed so that when the return and retrieve plate 52 moves away from the vertically stacked trays 19 the L-shaped members 54 slide one of the video cassettes out of its cassette tray 19. The cassette changing device 50 further includes a second motor 55, which operates bidirectionally and which is electrically controlled by the computer so that it rotates only 200° of a full 360° rotation, a motor arm 56 which is mechanically coupled to the second motor 55 and a connecting arm 57, which is pivotally coupled at one end to the motor arm 56 and pivotally coupled to the return and retrieve plate 52 at the other end.

Figure 6:
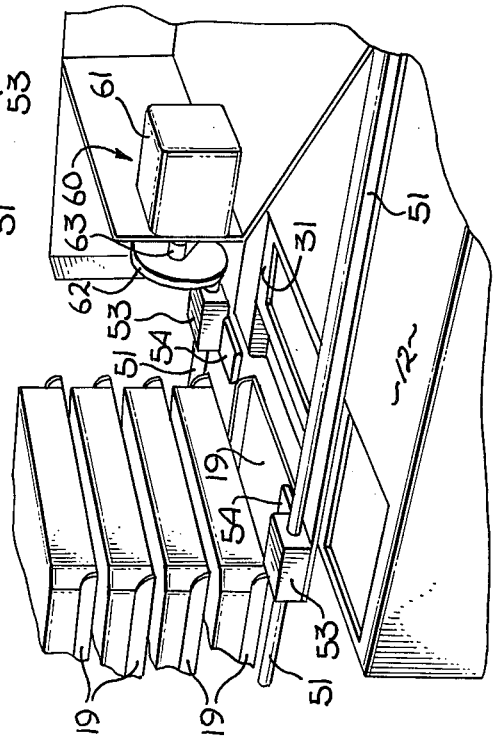
FIG. 6 is a perspective view of a plurality of vertically stacked cassette trays and a device for pushing the video cassette into the video cassette player of FIG. 1.

Referring still to FIG. 5 in conjunction with FIG. 1 the cassette changing device 50 still further includes a pressing device 60 for pushing the top 31 of the video cassette player 12 downward after a video cassette has been inserted into its cassette chamber 30. The pressing device 60 includes a third motor 61, which is electrically controlled by the computer and which is adapted to make one complete revolution when the computer receives a signal that a video cassette has been placed in the cassette chamber 30. Referring briefly to FIG. 6 in conjunction with FIG. 1 and FIG. 5, the pressing device 60 also includes a first disc, or pressure wheel, 62 which is mechanically coupled to one end of a lever arm 63 which is mechanically coupled to the shaft of the third motor 61 at its other end.

The computer signals the first motor 16 to move the vertically stacked cassette trays 19 upwardly or downwardly in response to the programmer's inputs. The computer receives information of the vertical location of the cassette trays 19 from the sensor system 40 and stops the first motor 16 when the desired cassette tray 19 is in the loading position.

The operation of the cassette changing device 50 can best by described by referring first to FIG. 7 and FIG. 8 in conjunction with FIG. 5 and FIG. 6. After the plurality of vertically stacked cassette trays 19 has been moved up or down by the first motor 16 to where the desired cassette tray 19 is in its loading position, the return and retrieve plate 52 moves horizontally toward the third motor 61 cathching the rear corners of the video cassette with the two L-shaped members 54 and thereby sliding the video cassette off its cassette trays 19 and into the cassette chamber 30 of the video cassette player 12. The retrieve and return plate 52 rides on two parallel support and guide rods 51 and is mechanically coupled thereto by four nylon bearings 53. The The movement of the return and retrieve plate 52 is controlled by the second motor 55 which swings the motor arm 56 in an approximately semicircular arc. The motor arm 56 is mechanically coupled to the connecting arm 57 so that, depending on its position, it either pushes or pulls the connecting arm 57 along with the return and retrieve plate 52.

Once the video cassette is in the chamber 30 of the video cassette player 12, the disc 62, or pressure wheel, of the pressing device 60 swings downwardly to push the top, or carriage, of the video cassette player 12 into the play position. The disc 62 makes one revolution and returns to the up position.

When the video cassette is to be returned to its cassette tray 19, it is ejected from the video cassette player 12, which first takes its top 31 or carriage out of the play position. The second motor 55 pushes the return and retrieve plate 52 into the front edge of the video cassette and slides it out of the cassette chamber 30 and back into its cassette tray 19.

As previously noted the plurality of vertically stacked cassette trays 19 travels upwardly and downwardly. The dimensions of the return and retrieve plate 52 are such that neither the L-shaped members 54 nor any portion of the plate 52 contacts or interferes with the movement of the vertically stacked cassette trays 19. Further, the portion of return and retrieve plate 52, which contacts the front edge of the video cassette and which travels over its cassette tray 19 as it slides the video cassette thereon, is pulled back a short distance by the second motor 55, which rotates its shaft approximately ten degrees (10°) past the center line of the cassette changing device 50, so that this position does not interfere with the vertical movement of the cassette trays 19. Similarly, the rear corners of the return and retrieve plate 52 are backed off from the chamber 30 of the video cassette player 12.

Referring the FIG. 9 in conjunction with FIG. 8 and FIG. 7, the pressing device 60 is shown as it pushes the top 31, or carriage, of the video cassette player 12 into the play position. Reference to FIG. 8 shows the video cassette after it has been slid into the cassette chamber 30. One should note that no part of the return and retrievve plate 52 is contacting the video cassette in FIG. 8.

From the foregoing it can be seen that an automatic, programmable video cassette player-changer has been described. The key elements of the video cassette player-changer are a cassette changing device and a plurality of vertically stacked trays whose position is determined by a sensor system.

It should be noted that the schematics of the video cassette player-changer are not drawn to scale and that distances of and between figures are not to be considered significant. Accordingly, it is intended that the foregoing disclosure and showings made in the drawing shall be considered only as illustrations of the principle of the present invention.

What is claimed is:

1. An improved cassette changer for use in combination with an automatic, programmable video cassette player-changer having plurality of video cassette players which use video cassettes containing visual material for a television audience and a television monitor electrically coupled to each of the plurality of video cassette players including:

a. a plurality of vertically stacked cassette trays, each of said cassette trays adapted to contain one of the video cassettes;
   b. a housing adapted to contain the plurality of video cassette players, the plurality of vertically stacked cassette trays and the television monitor;
   c. a support member adapted to maintain plurality of vertically stacked cassette trays in a fixed position;
   d. a first motor adapted to be driven bidirectionally in response;
   e. a screw adapted to extend the approximate height of the housing and mechanically coupled to the first motor;
   f. first coupling device for coupling the support member to the screw, the coupling device being mechanically coupled in such that the support member is raised or lowered by the rotation of the screw;

said improved cassette changer comprising:

a. a return and retrieve plate that has four corners adapted to enclose the edges of a video cassette and an opening adapted to allow the video cassette to pass through it, said return and retrieve plate also having an edge adapted to contact the first edge of the video cassette;
   b. four nylon bearings, each of which is attached in one of said corners of said return and retrieve plate;
   c. a pair of parallel support and guide rods disposed perpendicular to the plurality of vertically stacked cassette trays in the horizontal plane, said support and guide rods mechanically coupled to said return and retrieve plate by said nylon bearing so that it may move laterally in the horizontal plane;
   d. a pair of L-shaped members, each of which is coupled to one of said corners of said return and retrieve plate adjacent to the rear edge of the video cassette;

e. a first mechanical means for pulling and pushing said return and retrieve plate in a lateral direction; and f. pressing means for pushing down upon the top of the video cassette player.

2. An improved cassette changer according to claim 1 wherein said first mechanical means comprises:

a. a second motor having a shaft, said second motor is adapted to rotate its said shaft approximately 200°, bidirectionally;

b. a first motor arm, having a first end, and a second end, said first end is mechanically coupled to said shaft of said second motor; and c. a connecting arm, having a first end and a second end, said first end is pivotally coupled to said second end of said first motor arm and said second end is pivotally coupled to said return and retrieve plate.

3. An improved cassette changer according to claim 2 wherein said pressing means comprises:

a. a third motor having a shaft, said third motor adapted to have its said shaft turn one revolution;

b. a second motor arm, having a first and a second end, said first end being mechanically coupled to said shaft of said second motor; and c. a disc mechanically coupled to said second end of said second arm.

* * * * *